United States Patent
Kim

(10) Patent No.: US 7,102,533 B2
(45) Date of Patent: Sep. 5, 2006

(54) AUTOMATIC METER READING SYSTEM AND METHOD USING TELEPHONE LINE

(75) Inventor: Sung Kyung Kim, Chungcheongbuk-Do (KR)

(73) Assignee: LG Electronics Inc., Seoul (KR)

( * ) Notice: Subject to any disclaimer, the term of this patent is extended or adjusted under 35 U.S.C. 154(b) by 685 days.

(21) Appl. No.: 10/247,292

(22) Filed: Sep. 20, 2002

(65) Prior Publication Data

US 2003/0058129 A1    Mar. 27, 2003

(30) Foreign Application Priority Data

Sep. 25, 2001 (KR) ............................... 2001-59230

(51) Int. Cl.
*G08B 23/00* (2006.01)
*H04M 11/00* (2006.01)

(52) U.S. Cl. .............................. 340/870.02; 376/106.1; 376/106.3; 376/93.01

(58) Field of Classification Search ............................... 340/870.01–870.11, 870.18; 379/93.01, 379/106.1, 106.3; 455/415, 423
See application file for complete search history.

(56) References Cited

U.S. PATENT DOCUMENTS

| | | | |
|---|---|---|---|
| 5,311,581 A * | 5/1994 | Merriam et al. ........ | 379/106.07 |
| 5,677,947 A * | 10/1997 | Oliver .................... | 379/106.03 |
| 6,208,266 B1 * | 3/2001 | Lyons et al. ........... | 340/870.02 |
| 6,646,731 B1 * | 11/2003 | Wolleswinkel .............. | 356/138 |
| 6,900,737 B1 * | 5/2005 | Ardalan et al. ........ | 340/870.02 |
| 2002/0067284 A1 * | 6/2002 | Chamberlain et al. . | 340/870.02 |

* cited by examiner

*Primary Examiner*—Jeffery Hofsass
*Assistant Examiner*—Kimberly Jenkins
(74) *Attorney, Agent, or Firm*—Fleshner & Kim, LLP

(57) ABSTRACT

An automatic meter reading system includes meter-reading devices attached to respective utility meters and a remote control center collecting measured commodity utilization from the meter-reading devices through a telephone network when a meter reading request signal is received from the remote control center. The meter-reading device includes a remote control center interface, a call control processing unit for extracting a call control signal from the meter reading request signal, a main control unit (MCU) for generating a CID control signal based on the call control signal, a caller ID (CID) decoder for decoding the meter reading request signal and extracting CID from a meter reading request signal based on the CID control signal from the MCU, a meter reader connected to the utility meter for reading commodity utilization measured by the utility meter under control of the MCU, and a memory for temporally storing the measured commodity utilization.

21 Claims, 3 Drawing Sheets

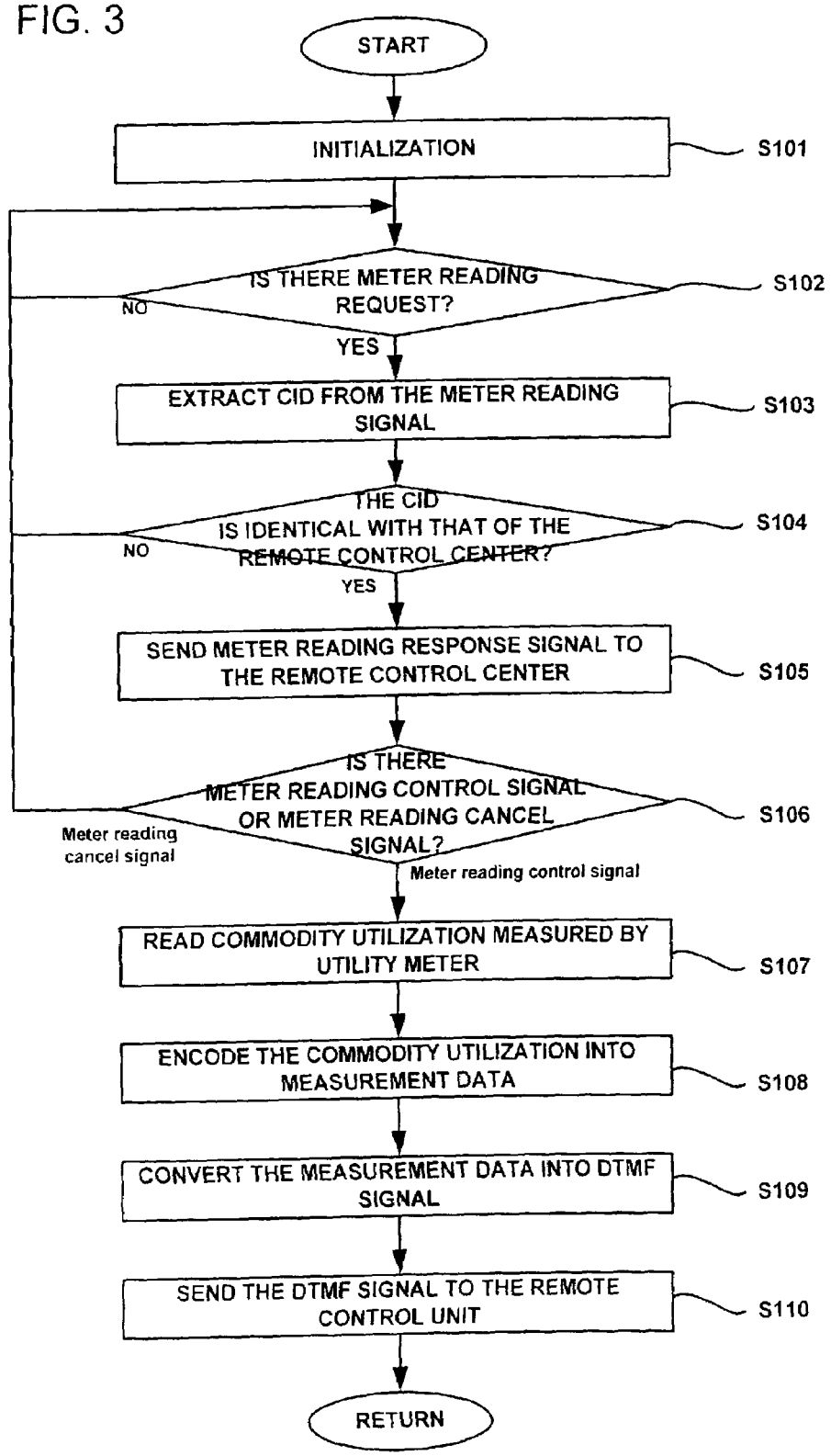

AUTOMATIC METER READING SYSTEM AND METHOD USING TELEPHONE LINE

BACKGROUND OF THE INVENTION (a) Field of the Invention

The present invention relates to an automatic meter reading technique and, in particular, to a system and method for measuring commodity utilization and transmitting the measurement to a remote control center over a telephony network.

(b) Description of the Related Art

Typically, utility companies have used meter reading personnel to visually read the consumed commodity information provided by utility meters and manually record the information. In recent years, however, there have been efforts to deploy fully Automatic Meter Reading Systems (AMRS).

Most AMRS systems are comprised of a utility meter, an end device attached to the utility meter for reading the commodity utilization, and a remotely located service management center, such that the end device communicates data with the remote control center over wireless communication link.

FIG. 1 is a schematic block diagram illustrating a conventional automatic meter reading system. In FIG. 1, the automatic meter reading system includes an end device 72 attached to a utility meter (not shown) and a remote control center 70 communicating with the end device such that the end device 72 reads commodity usage, such as electricity, gas, and etc., measured the utility meter and sends the measurement to the remote control center 70 under control of the remote control center 70. The end device 72 includes a detector 74 attached to the utility meter for indicating the meter reading, a memory 75 for storing data from the detector 74, a radio frequency (RF) module 71 for communicating the data with the remote control center 70, and a micro control unit 73 cooperatively controlling the above parts. The data encoded by the detector 74 based on the value measured by the utility meter are stored in the memory 75 and then transmitted to the remote management center 70 after processed at the RF module 71 under control of the MCU 73.

In the above structured conventional automatic meter reading system, if it is required to determine subscriber's consumption of the utility, the remote management center 70 broadcasts an inspection request signal containing at least one end device ID. All the end devices located in coverage of the remote management center 70 receive the inspection request signal. The inspection request signal is processed by the RF module 71 and then transferred to the MCU 73 such that the MCU 73 checks the end device ID contained in the inspection and controls the detector 74 so as to read commodity utilization measured by the utility meter if the end device ID is identical with the ID previously stored in the memory 75. The detector 74 reads the commodity utilization from the utility meter and then store the measurement data in the memory 75. Sequentially, the RF module 71 processes and transmits the measurement data to the remote control center 70 under control of the MCU 73.

Accordingly, the remote control center 70 issues a billing statement for the subscriber based on the measurement data received from the target end device 72.

However, the conventional automatic meter reading system has drawbacks in that the large investments are required for implementing wireless meter reading system in infrastructure and the wireless system are not useful for servicing customers who are widely separated because the communication range of the RF module is limited. Even tough the wires automatic meter reading system is implemented; it is unlikely to expect reliable data transmission because of the attenuation characteristics of the RF.

SUMMARY OF THE INVENTION

The present invention has been made in an effort to solve the above problems of the prior art.

It is an object of the present invention to provide a remote automatic meter reading system and method capable of remotely controlling meter-reading devices using telephone line.

It is another object of the present invention to provide a remote automatic meter reading system and method capable of enhancing communication stability and data reliability by communicating with meter-reading devices over the wired telephone network.

It is still another object of the present invention to provide a remote automatic meter reading system and method capable of reducing whole implementing costs using existing telephone network.

To achieve the above objects, the automatic meter reading system of the present invention comprises a plurality of meter-reading devices attached to respective utility meters and a remote control center communicating with the meter-reading devices through telephone network. Each meter-reading device reads the commodity utilization measured by the utility meters when a meter reading request signal is received from the remote control center.

The meter-reading device comprises an interface module connecting the meter-reading device to the remote control center through a telephone line, a call control processing unit for extracting a call control signal from the meter reading request signal, a main control unit (MCU) for generating a CID control signal based on the call control signal, a caller ID (CID) decoder for decoding the meter reading request signal and extracting CID from a meter reading request signal based on the CID control signal from the MCU, a meter reader connected to the utility meter for reading commodity utilization measured by the utility meter under control of the MCU, and a memory for temporally storing the measured commodity utilization.

The MCU compares the CID extracted by the CID decoder with a previously stored CID for identifying the remote control center.

The MCU controls the meter reading device so as to maintain the meter reading device in hook state if the CID is not identical with remote control center CID, and in order for the meter-reading device to enter an off-hook state if the CID is identical with the remote control center CID.

The MCU controls the call processing unit such that the call processing unit sends a meter reading response signal contained a previously assigned device ID to the remote control center in a form of DTMF signal.

The remote control center determines whether or not the device ID is one of registered device IDs. The remote control center sends a meter reading confirmation signal to the meter-reading device in the form of DTMF signal when the device ID is one of the registered device ID. The MCU produces a meter reading signal to the meter reader based on the meter reading confirmation signal.

The meter reader reads commodity utilization measured by the utility meter and stores measurement data in the memory.

The call processing unit encodes the measurement data stored in the memory into DTMF signal and sends the DTMF signal to the remote control center under control of the MCU.

To achieve the above objects, an automatic meter reading method of the present invention comprises the steps of initializing the meter reading device, receiving a meter reading request signal from a remote control center through a telephone line, extracting a caller ID (CID) from the meter reading request signal, determining whether or not the CID is identical with a previously stored remote control center CID, sending a unique device ID to the remote control center when the CID is identical with the remote control center CID, receiving a meter reading confirmation signal from the remote control center, reading the utility consumption, and transmitting measurement data based on utility consumption to the remote control center.

The meter reading confirmation signal is generated when the device ID is identified as one of registered device IDs at the remote control center.

The meter reading confirmation signal is a dual tone multi frequency (DTMF) signal.

The automatic meter reading method further comprises the step of receiving a meter reading cancel signal from the remote control center.

The meter reading cancel signal is generated when the device ID is not identical with any of registered device IDs at the remote control center.

The automatic meter reading method further comprises the step of encoding the utility consumption into measurement data. The measurement data is transmitted in a form of a DTMF signal.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 3 is a flowchart illustrating an automatic meter reading method according to a preferred embodiment of the present invention.

DETAILED DESCRIPTION OF THE PREFERRED EMBODIMENTS

A preferred embodiment of the present invention will be described hereinafter with reference to the accompanying drawings.

Figure 1:
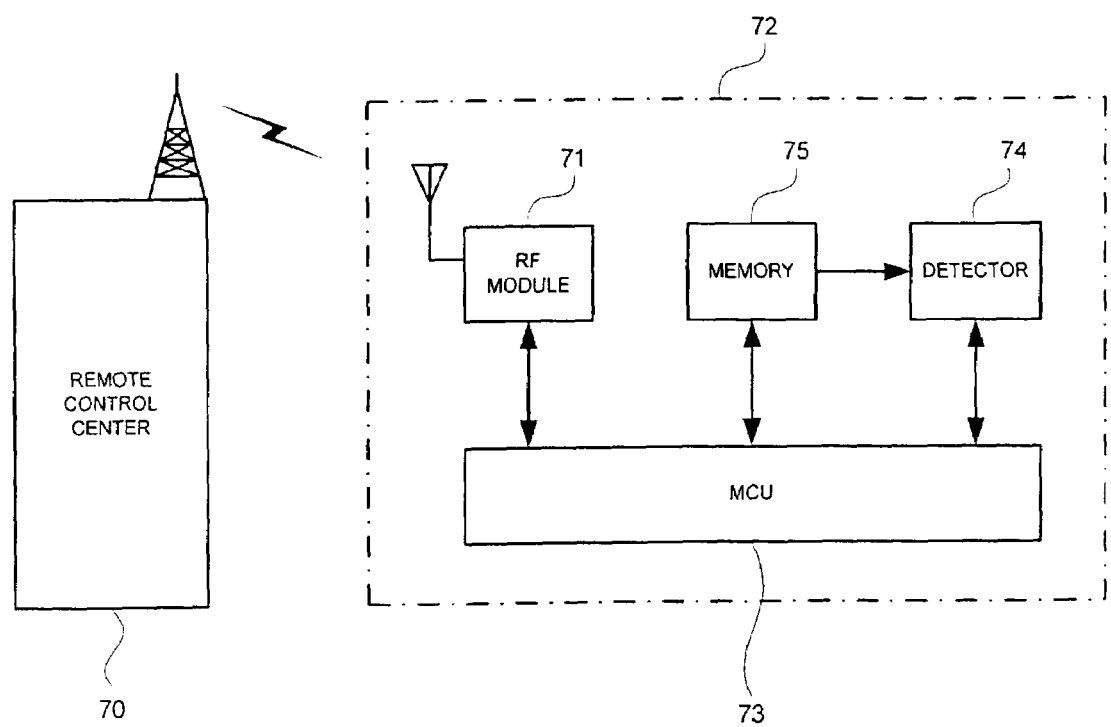
FIG. 1 is a schematic view showing a conventional meter reading system.
Figure 2:
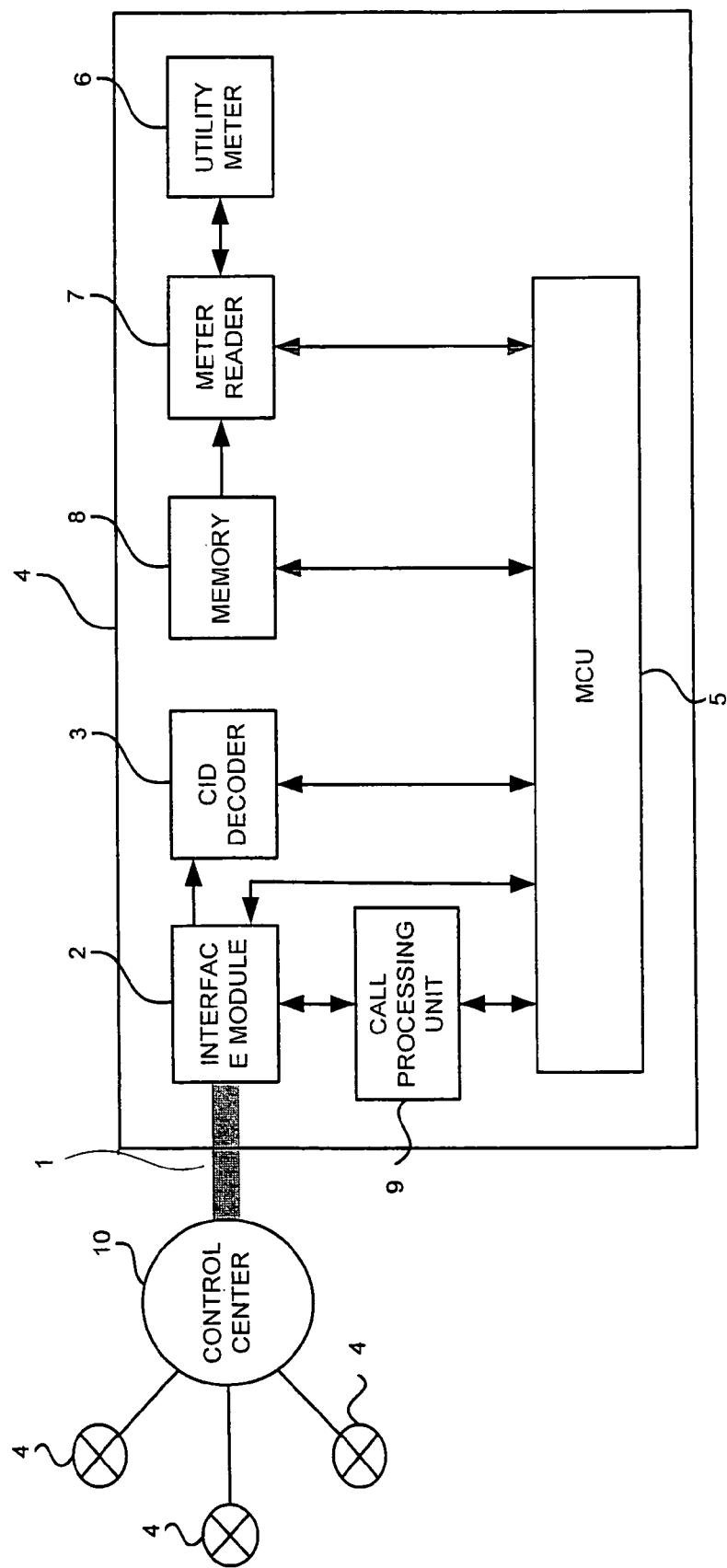
FIG. 2 is a schematic block diagram illustrating an automatic meter reading system according to a preferred embodiment of the present invention.

FIG. 2 is a block diagram showing the automatic meter reading system of the present invention.

As shown in FIG. 2, a plurality of meter-reading devices 4 electrically coupled to respective utility meters 6 communicates with a remote control center 10 through telephone lines 1. Each meter-reading device comprises a interface module 2, a caller ID (CID) decoder 3 coupled to the interface module 2 for extracting a CID from a signal received over the telephone line 1, a main control unit (MCU) 5 for checking whether or not the CID extracted at the CID decoder 3 is identical with the CID previously allocated to the meter-reading device 4 and generating a meter-reading control signal when the extracted CID is identical with the previously allocated CID, a meter reader 7 connected to a target utility meter 6 for reading the commodity utilization measured by the utility meter 6 based on the meter reading control signal and coding the measured commodity utilization into useful measurement data, a memory 8 for storing the measurement data coded at the meter reader 7, and a call-processing unit 9 for converting the measurement data stored in the memory 8 into a DTMF signal and sending the DTMF signal to the remote control center 10 over the telephone line 1. All the parts of the meter-reading device 4 cooperate under control of the MCU 5.

The operation of the above-structured automatic meter reading system of the present invention will be described hereinafter with reference to FIG. 2 and FIG. 3.

As shown in FIG. 3, once the meter-reading device 4 turns on, the MCU 5 initializes the meter-reading device 4 at step S101 and determines whether or not a meter reading request signal is received from the remote control center 10 through the interface module 2 at step S102. If the meter reading request signal is received, the MCU 5 controls such that the CID decoder 3 decodes the meter reading request signal and extracts a CID contained in the meter reading request signal at step S103 and determines whether or not the CID extracted at the CID decoder 3 is identical with a remote control center CID previously stored in the memory 8 at step S104. If it is determines that the extracted CID is identical with the remote control center CID, the main control unit 5 sends a meter reading response signal containing the device ID to the remote control unit 10 at step S105 and determines whether a meter reading confirmation signal or a meter reading cancel signal is received from the remoter control center 10 at step S105.

The remote control center 10 determines whether or not the device ID received from the meter-reading device 4 is identical with the target device ID intended to inspect and then sends the meter reading confirmation signal to the meter-reading device 4 in a dual tone multi frequency (DTMF) format if the device ID is identified. On the other hand, if the device ID is not identical with the target device ID, the remote control center 10 sends the meter reading cancel signal to the meter-reading device 4 so as to cancel the meter reading request.

If receiving the meter reading cancel signal from the remote control center 10 at step S105, the MCU 5 controls such that the meter-reading device ends the meter-reading function. On the other hand, if receiving the meter reading confirmation signal from the remote control center 10 at step S105, the MCU 5 produces a meter reading control signal to the meter reader 7 such that the meter reader 7 reads the commodity utilization measured by the utility meter 6 according to the meter reading control signal at step S106 and encodes the measured commodity utilization into measurement data at step S107.

Sequentially, the MCU 5 controls the call processing unit 9 such that the call processing unit 9 converts the measurement data into a DTMF signal at step S108 and sends the DTMF signal to the remote control center 10 through the interface module at step S109.

If receiving the measurement data in the DTMF format, the remote control center 10 converts into the original measurement data, stores the measurement data in a storage region allocated to the target meter-reading device, and then send a meter reading complete signal to the meter-reading device 4 such that the meter-reading device ends the meter reading function.

The remote automatic meter reading method of the present invention will be described in more detail.

In case that it is required to gather information about the utility consumption for at least one subscriber, the remote control center 10 sends meter reading request signal(s) having CID(s) to corresponding meter-reading device(s) installed to the utility meter(s), for example watt-hour meter over the telephone line 1.

If receiving the meter reading request signal, the interface module 2 sends the meter reading request signal to the call processing unit 9 and the CID decoder 3. The call control processing unit 9 extracts a call control signal contained in the meter reading request signal and sends the call signal to the MCU 5. If receiving and recognizing the call signal, the MCU 5 controls the CID decoder 3 such that the CID decoder 3 extracts the CID from the meter reading request signal and sends the CID to the MCU 5. The MCU 5 compares the CID with the previously stored CID for identifying the remote control center 10. If the received CID is not identical with the remote control center CID, the MCU maintains on-hook state. On the other hand, if the received CID is identical with the remote control center CID, the MCU 5 controls in order for the meter-reading device 4 to enter an off-hook state and controls the call processing unit 9 such that the call processing unit 9 sends the meter reading response signal contained the unique device ID to the remote control center 10 in the form of the DTMF signal through the telephone line 1.

The remote control center 10 receives meter reading response signal and determines whether or not the device ID contained in the meter reading response signal is identical with the device ID of the target meter-reading device 4 which is previously registered at the remote control center 10. If the device ID is identical with the registered device ID, the remote control center 10 sends the meter reading confirmation signal to the meter-reading device 4 in the form of DTMF signal. If the meter reading confirmation signal is received, the interface module 2 sends the meter reading confirmation signal to the MCU 5 and the MCU 5 produces the meter reading control signal to the meter reader 7 based on the meter reading confirmation signal such that the meter reader 7 reads the commodity utilization measured by the utility meter 6 and stores the measurement in the memory 8.

Consequently, the measurement data are converted into the DTMF signal at the call processing unit 9 and then is sent to the remote control center 10.

If the DTMF signal received from the meter-reading device 4, the remote control center 10 decodes the DTMF signal so as to recover the measurement data and then stores the measurement data at a specific memory region together with the device ID. Simultaneously, the remote control center 10 sends the meter reading complete signal to the meter-reading device 4 so as to end the meter reading procedure. The measurement data can be used for issuing billing statement for the subscriber as well as for useful statistics.

As described above, since the automatic meter reading system and method of the present invention uses the telephone network for remotely collecting subscriber's utility consumptions, it is possible to reduce inspection costs relative to the wireless meter reading system which requires installation of the additional expensive RF devices.

Also, the automatic meter reading system and method of the present invention uses wired telephone lines for measurement data communication such that the inspection range is not limited as long as the subscriber is connected to the telephone network.

Furthermore, the wired telephone line provides communication stability relative to the RF channel such that it is possible to perform reliable utility consumption inspection in real time.

Still more, in the automatic meter reading system and method the inspection is performed based on the inspection-on-demand technique, it is possible to gather the utility consumption data for any subscriber at any time.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An automatic meter reading system comprising:
a plurality of meter-reading devices attached to respective utility meters; and
a remote control center communicating directly with the meter-reading devices through telephone lines,
wherein each meter-reading device reads commodity utilization measured by the utility meters when a meter reading request signal is received from the remote control center over the telephone lines, and
wherein the meter-reading device includes a main control unit (MCU) and a caller ID (CID) decoder, the CID decoder decoding the meter reading request signal and extracting a CID from the meter reading request signal, the MCU comparing the CID extracted by the CID decoder with a previously stored CID for identifying the remote control center and performing one of maintaining on-hook state if the CID is not identical with the remote control center CID or controlling the meter reading device to enter an off-hook state if the CID is identical with the remote control center CID.

2. The automatic meter reading system of claim 1, wherein the meter-reading device further comprises:
an interface module connecting the meter-reading device to the remote control center through a telephone line;
a call control processing unit for extracting a call control signal from the meter reading request signal;
the MCU generating a CID control signal based on the call control signal;
the caller ID (CID) decoder extracting the CID from the meter reading request signal based on the CID control signal from the MCU;
a meter reader connected to the utility meter for reading commodity utilization measured by the utility meter under control of the MCU; and
a memory for temporally storing the measured commodity utilization.

3. The automatic meter reading system of claim 2, wherein the MCU controls the call control processing unit such that the call control processing unit sends a meter reading response signal contained a previously assigned device ID to the remote control center in a form of DTMF signal.

4. The automatic meter reading system of claim 3, wherein the remote control center determines whether or not the device ID is one of registered device IDs.

5. The automatic meter reading system of claim 4, wherein the remote control center sends a meter reading confirmation signal to the meter-reading device in the form of DTMF signal when the device ID is one of the registered device ID.

6. The automatic meter reading system of claim 5, wherein the MCU produces a meter reading signal to the meter reader based on the meter reading confirmation signal.

7. The automatic meter reading system of claim 6, wherein the meter reader reads commodity utilization measured by the utility meter and stores measurement data in the memory.

8. The automatic meter reading system of claim 7, wherein the call processing unit encodes the measurement data stored in the memory into DTMF signal and sends the DTMF signal to the remote control center under control of the MCU.

9. The automatic meter reading system of claim 8, wherein the remote control center decodes the DTMF signal from the meter-reading device into the measurement data and stores the measurement data in a specific memory region assigned for the corresponding device.

10. An automatic meter reading method for a meter reading system including a plurality of meter reading devices respectively attached to utility meters and a remote control center directly connected to the meter reading devices through telephone lines, comprising:
    (a) initializing meter reading device of the plurality of meter reading devices;
    (b) receiving, at the meter reading device, a meter reading request signal from the remote control center through a telephone line;
    (c) authorizing the meter reading device to read utility consumption measured by utility meter attached to the meter reading device, the authorizing including extracting a caller ID (CID) from the meter reading request signal, determining whether or not the CID is identical with a previously stored remote control center CID, and one of sending a unique device ID to the remote control center when the CID is identical with the remote control center CID or going to (b) when the CID is not identical with the remote control center CID;
    (d) reading the utility consumption; and
    (e) transmitting measurement data based on the utility consumption directly to the remote control center from the meter reading device over the telephone line.

11. The automatic meter reading method of claim 10, wherein (c) further includes receiving a meter reading confirmation signal from the remote control center.

12. The automatic meter reading method of claim 11, wherein the meter reading confirmation signal is generated when the device ID is identified as one of registered device IDs at the remote control center.

13. The automatic meter reading method of claim 12, wherein the meter reading confirmation signal is a dual tone multi frequency (DTMF) signal.

14. The automatic meter reading method of claim 10, wherein (c) further includes receiving a meter reading cancel signal from the remote control center.

15. The automatic meter reading method of claim 14, wherein the meter reading cancel signal is generated when the device ID is not identical with any of registered device IDs at the remote control center.

16. The automatic meter reading method of claim 10, wherein (d) includes encoding the utility consumption into measurement data.

17. The automatic meter reading method of claim 10, wherein the measurement data is transmitted in a form of a DTMF signal.

18. An automatic meter reading method for a meter reading system including a plurality of meter reading devices respectively attached to utility meters and a remote control center connected directly to the meter reading devices through telephone lines, comprising:
    initializing a meter reading device;
    receiving a meter reading request signal at the initialized meter reading device directly from a remote control center through a telephone line;
    extracting a caller ID (CID) from the meter reading request signal;
    determining whether or not the CID is identical with a previously stored remote control center CID;
    sending a unique device ID to the remote control center when the CID is identical with the remote control center CID;
    receiving a meter reading cancel signal at the meter reading device from the remote control center, the meter reading cancel signal being generated when the device ID is not identical with any of registered device IDs at the remote control center;
    receiving a meter reading confirmation signal from the remote control center at the meter reading device, the meter reading confirmation signal being generated when the device ID is identical with one of the registered device IDs at the remote control center;
    reading utility consumption measured by a utility meter attached to the meter reading device; and
    transmitting measurement data based on the read utility consumption from the meter reading device directly to the remote control center over the telephone line.

19. The automatic meter reading method of claim 18, wherein the meter reading confirmation signal is a dual tone multi frequency (DTMF) signal.

20. The automatic meter reading method of claim 18 further comprising encoding the utility consumption into measurement data.

21. The automatic meter reading method of claim 20, wherein the measurement data is transmitted in a form of a DTMF signal.

* * * * *